(12) United States Patent
Liu

(10) Patent No.: US 6,745,091 B2
(45) Date of Patent: Jun. 1, 2004

(54) DIGITAL AUDIO SIGNAL PLAYER HAVING A SIMULATED ANALOGUE RECORD

(75) Inventor: Han-Chih Liu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 245 days.

(21) Appl. No.: 10/139,257

(22) Filed: May 7, 2002

(65) Prior Publication Data

US 2003/0212464 A1 Nov. 13, 2003

(51) Int. Cl.[7] .............................................. G06F 17/00
(52) U.S. Cl. ....................................... 700/94; 381/119
(58) Field of Search .................... 381/61, 119; 700/94; 704/270, 272, 278; 369/3, 32.01, 69

(56) References Cited

U.S. PATENT DOCUMENTS

| | | | | | |
|---|---|---|---|---|---|
| 5,502,703 A | * | 3/1996 | Yamada et al. | .......... | 369/47.54 |
| 5,512,704 A | * | 4/1996 | Adachi | ........................ | 84/605 |
| 5,675,557 A | * | 10/1997 | Hubinger | ........................ | 369/4 |
| 6,058,079 A | * | 5/2000 | Usui | ............................ | 369/84 |
| 6,545,953 B1 | * | 4/2003 | Herbert | ........................ | 369/4 |
| 6,618,329 B2 | * | 9/2003 | Liu | .............................. | 369/4 |
| 2002/0111703 A1 | * | 8/2002 | Cole | ........................... | 700/94 |

FOREIGN PATENT DOCUMENTS

GB 2139762 * 11/1984 ........... G06F/3/033

* cited by examiner

*Primary Examiner*—Xu Mei
(74) *Attorney, Agent, or Firm*—Rosenberg, Klein & Lee

(57) ABSTRACT

A digital audio signal player having a simulated analogue record has a control element, which can be turned with hands to simulate an analogue record on a turntable being turned by the hands so that music can be played with special effect, i.e. speed and direction changing according to movement of the control element. Those portions of musical data that are suitable to be played with special effect are previously marked in the RAM. When the DJ touches the control element, the marked data will be located and sent out immediately during the course of playing music so that the DJ can perform the special effect on the marked suitable portions of music without delay when he wants to.

1 Claim, 2 Drawing Sheets

DIGITAL AUDIO SIGNAL PLAYER HAVING A SIMULATED ANALOGUE RECORD

BACKGROUND OF THE INVENTION

The present invention relates to a digital audio signal player having a simulated analogue record, which can mark those portions of data of music stored in a RAM that are suitable for production of special effect so that these portions can be immediately located, and played as music with changing speed and direction when a DJ's hand turns a control element to simulate an analogue record being turned on a turntable with the DJ' hand.

In order to help increase hot and exciting atmosphere in a concert or a party such as is held in a PUB or a dancing hall, the DJ would make the music played with changing tone and speed by means of moving the analogue record on the turntable in various ways. When the DJ stoops moving the record with his hands, the record will be played on the record player in a normal way immediately.

However, a single analogue record has very limited capacity for storing music, therefore the DJ has to prepare a lot of records in each party that are likely to cause him inconvenience due to the large size and heavy weight.

In order to overcome the above disadvantages, referring to FIG. 2, the inventor of the present invention had disclosed a digital audio signal player having a simulated analogue record, which includes a driving IC 11, a CD driving motor 111, a turntable 112, an ejection motor 113, a laser pick-up 114, a laser pick-up moving motor 115, a microprocessor 12, a control panel 121, a high frequency amplifier 13, a CD digital processor 14, a digital audio signal processor 15, a dynamic RAM 151, a digital/analog converter 17, a turnable control element 16, a high frequency alternator 19 and a low pass filter 18.

The turntable 112 is provided for holding an analogue CD, and connected to the CD driving motor 111. The driving IC 11 is electrically connected to the CD driving motor 111, and the ejection motor 113 for activating the same to turn the turntable 112, and to eject the turntable 112 for removal of the CD respectively.

When the microprocessor 12 is activated, the same will make the high frequency amplifier 13 send out laser light, and activate the laser pick-up 114 by means of both the CD digital processor 14 and the driving IC 11. The driving IC 11 will also activate the laser pick-up moving motor 115 to move the laser pick-up 114. The laser pick-up 114 sends a signal to the CD digital processor 14 via the high frequency amplifier 13 such that the CD digital processor 14 can inform the microprocessor 12 whether the laser light has focused; if the laser light fails to focus, the microprocessor 12 will stop; if the laser light focuses successfully, the microprocessor 12 will activate the CD digital processor 14 so that the processor 14 makes the driving IC 11 activate the CD driving motor 111; the analogue CD positioned on the turntable 112 is rotated at two times the normal speed when the CD driving motor 111 is activated. And, the laser pick-up 114 reads the data of the analogue CD, and sends the data to both the microprocessor 12 and the digital audio signal processor 15 via the high frequency amplifier 13 and the CD digital processor 14; the microprocessor 12 will also make the control panel 121, which is electrically connected to it, show information about the CD; the digital audio signal processor 15 will store the data of the CD in the dynamic RAM 151.

The control element 16 is made of conductive materials, and is electrically connected to the digital audio signal processor 15. The control element 16 has a light sensitive device 161, which will senses rotating speed and direction thereof.

The high frequency alternator 19 constantly sends out a high frequency signal, and has an output terminal electrically connected to P pole of a diode 191 connected in series with a buffer 192 electrically connected to the microprocessor 2; the control element 16 also has an output terminal connected to the P pole of the diode 191. The microprocessor 12 makes the digital audio signal processor 15 send out the digital data stored in the RAM 151 in a normal way so that the music is played in an original manner when it receives the high frequency signal in a non-reduced form. Because a human body has capacitance, the control element 16 will send an interfering signal to the diode 191 so as to reduce the high frequency signal passing through the diode 191 when touched by a hand of a person, thus making the microprocessor 12 receive a high frequency signal in a reduced form from the high frequency alternator 19. The microprocessor 12 makes the digital audio signal processor 15 send out the digital data in a manner according to the movement of the control element 16 as sensed by the light sensitive device 161 when receiving the reduced high frequency signal.

Therefore, music can be played with changing speed and direction by means of rotating the control element 6 with a hand, and can be played in a normal way as soon as the hand is removed from the control element 6. However, in light of the fact that only some particular portions of a music is suitable for production of special effect, i.e. played with changing speed and direction, there is an disadvantage to this audio signal player that the DJ has to listen very carefully to the music being played in order to recognize those portions suitable for special effect immediately; when he recognize the suitable portions, he will turn the control element to make the same played with changing speed and direction. Furthermore, in using this audio signal player, nothing can be done by the DJ to make the player play the suitable portions immediately but wait when he needs to produce special effect. In other words, this audio signal player is relatively inconvenient as compared with conventional record players; in using conventional players, the DJ only has to mark those portions of a record suitable for special effect previously, and can move the pickup to the suitable portions when he wants to produce special effect.

SUMMARY OF THE INVENTION

It is a main object of the present invention to provide a digital audio signal player having a simulated analogue record that can mark those portions of music that are suitable for production of special effect so that these portions can be immediately located, and played as music with changing speed and direction when a DJ's hand turns a control element to simulate an analogue record being turned on a turntable with the DJ's hand for producing special effect.

In the digital audio signal player having a simulated analogue record of the present invention, both a special memory activating button, and a special-function activating button are provided on the control panel; the special memory activating button is provided for a DJ to operate to mark those portions of musical data that are suitable for production of special effect in the dynamic RAM. When the special-function activating button is pressed to the on position, the marked suitable portions of musical data is located as soon as the microprocessor decides that a DJ is touching the control element with his hands; thus, the marked suitable portions of musical data are played as music immediately and with speed and direction changing in a manner according to the movement of the control element. Therefore, the DJ doesn't have to wait for those portions of music that are suitable for special effect to appear during the course of playing music.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
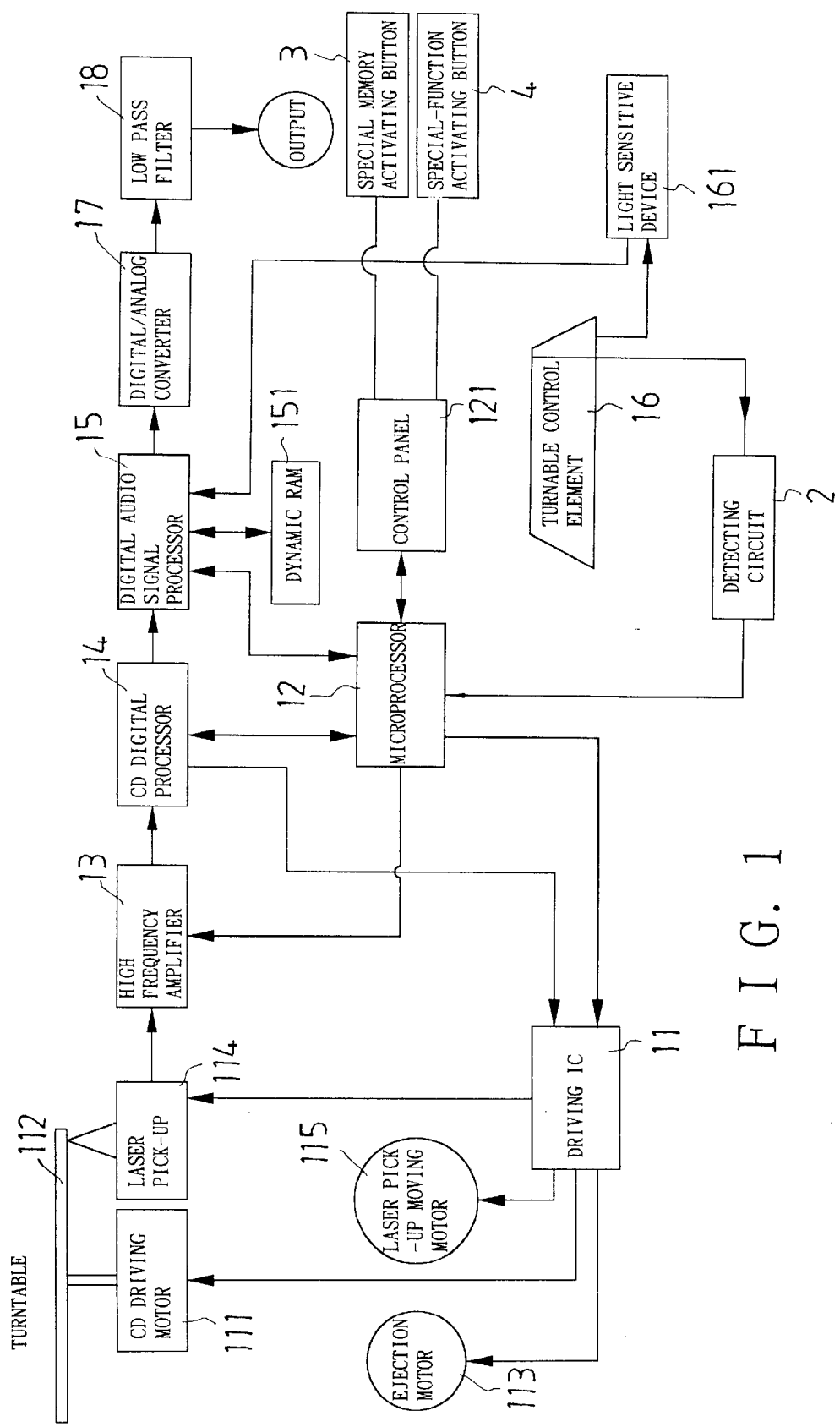
FIG. 1 is a block diagram of the circuit of the digital audio signal player having a simulated analogue record of the present invention.
Figure 2:
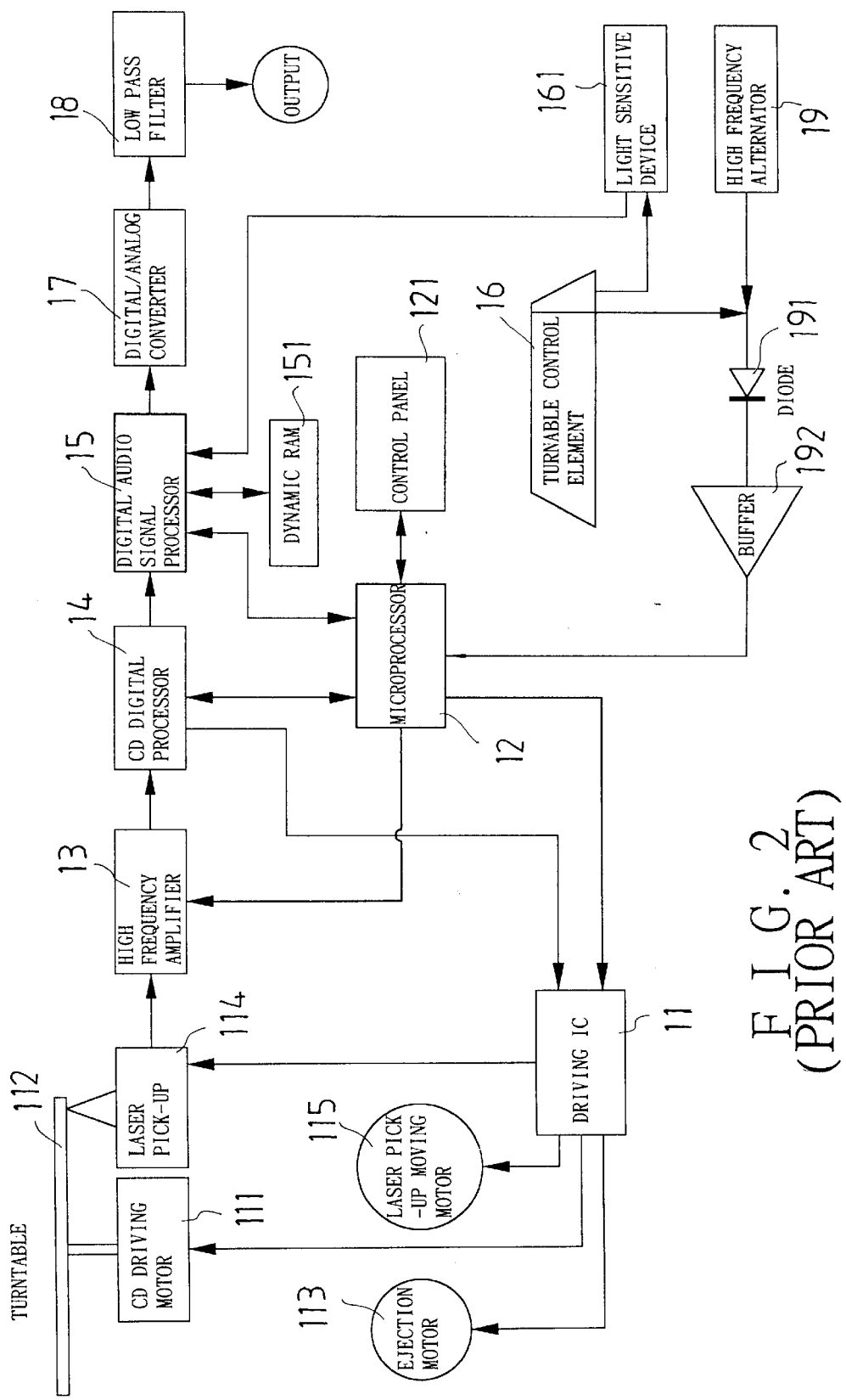
FIG. 2 is a block diagram of the circuit of the prior digital audio signal player having a simulated analogue record in the Background.

Referring to FIG. 1, a digital audio signal player having a simulated analogue record of the present invention includes a driving IC 11, a CD driving motor 111, a turntable 112, an ejection motor 113, a laser pick-up 114, a laser pick-up moving motor 115, a microprocessor 12, a control panel 121, a high frequency amplifier 13, a CD digital processor 14, a digital audio signal processor 15, a dynamic RAM 151, a digital/analog converter 17, a turnable control element 16, a detecting circuit 2, and a low pass filter 18.

The turntable 112 is provided for holding an analogue CD, and connected to the CD driving motor 111. The driving IC 11 is electrically connected to the CD driving motor 111, and the ejection motor 113 for activating the same to turn the turntable 112, and to eject the turntable 112 for removal of the CD respectively.

When the microprocessor 12 is activated, the same will make the high frequency amplifier 13 send out laser light, and activate the laser pick-up 114 by means of both the CD digital processor 14 and the driving IC 11. The driving IC 11 will also activate the laser pick-up moving motor 115 to move the laser pick-up 114. The laser pick-up 114 sends a signal to the CD digital processor 14 via the high frequency amplifier 13 such that the CD digital processor 14 can inform the microprocessor 12 whether the laser light has focused; if the laser light fails to focus, the microprocessor 12 will stop; if the laser light focuses successfully, the microprocessor 12 will activate the CD digital processor 14 so that the processor 14 makes the driving IC II activate the CD driving motor 111; the analogue CD positioned on the turntable 112 is rotated at two times the normal speed when the CD driving motor 111 is activated. And, the laser pick-up 114 reads the data of the analogue CD, and sends the data to both the microprocessor 12 and the digital audio signal processor 15 via the high frequency amplifier 13 and the CD digital processor 14; the microprocessor 12 will also make the control panel 121, which is electrically connected to it, show information about the CD; the digital audio signal processor 15 will store the data of the CD in the dynamic RAM 151. To play music, the data of the RAM 151 is converted into analogue ones by means of the digital/analog converter 17. And, the analogue data are processed by the low pass filter 8, and played as music.

The control element 16 is made of conductive materials, and is connected to both a light sensitive device 161 and a detecting circuit 2, which are then electrically connected to the digital audio signal processor 15, and the microprocessor 12 respectively. The light sensitive device 161 can sense the moving speed and direction of the control element 16. The control element 16 will send out an interfering signal when touched by a person's hand; the interfering signal is then sent to the microprocessor 12 via the detecting circuit 2 so that the microprocessor 12 can decide that the DJ wants to control the control element 16 to produce special effect on music with his hands. On deciding that the DJ wants to produce special effect on music due to the interfering signal, the microprocessor 12 make the digital audio signal processor 15 send out the data of the RAM 151 in a manner according to the movement of the control element 16 as sensed by the device 161.

In addition, a special memory activating button 3, and a special-function activating button 4 are provided on the control panel 121. The special memory activating button 3 is provided for the DJ to operate to mark those portions of music that are suitable for special effect in the dynamic RAM 151 during the course of playing music. And, when the special-function activating button 4 is pressed to the on position, the marked suitable portions of music will be located as soon as the microprocessor 12 decides that the DJ is touching the control element 16 with his hands. Consequently, the marked portions of music are played immediately and with speed and direction changing in a manner according to the movement of the control element 16.

From the above description, it can be easily understood that the present digital audio signal player has an advantage that the DJ can perform special effect immediately with the present player when he wants to, not having to wait for those portions of music to appear that are suitable for production of special effect.

What is claimed is:

1. A digital audio signal player having a simulated analogue record, comprising a microprocessor;

a high frequency amplifier, the high frequency amplifier being electrically connected to the microprocessor to send out laser light when activated by the microprocessor;

a CD digital processor electrically connected to both the microprocessor and the high frequency amplifier; the CD digital processor informing the microprocessor of status of focusing of the laser light; the microprocessor stopping working when the laser light fails to focus; the microprocessor activating a CD driving motor to rotate a CD turntable at twice a normal speed when the laser light succeeds in focusing;

a digital audio signal processor electrically connected to both the microprocessor and the CD digital processor;

a laser pick-up electrically connected to the high frequency amplifier; the laser pick-up sending data of the CD to the CD digital processor; the digital audio signal processor including a dynamic RAM to store the data of the CD with which;

a digital/analog converter electrically connected to the digital audio signal processor for converting the digital data of the RAM into analogue ones, which are then sent through a low pass filter and played as music;

a control element electrically connected to the microprocessor; the control element being made of conductive materials; the control element having a light sensitive device, which is electrically connected to the digital audio signal processor, and will sense speed and direction of movement of the control element; and, a detecting circuit electrically connected to both the microprocessor and the control element; the detecting circuit being capable of detecting interfering signals which are produced when the control element is touched by a person's hands; the interfering signals being sent to the microprocessor so that the same makes the digital audio signal processor send out data of music in the RAM with speed and direction changing according to the movement of the control element when deciding that a person's hands are contacting the control element;

and being characterized by both a special memory activating button and a special-function activating button provided on the control panel;

the dynamic RAM being made to mark those portions of musical data that are suitable for special effect by means of operating the special memory activating button during a course of the suitable portions being played; when the special-function activating button is pressed to an on position, the marked suitable portions of musical data being located as soon as the microprocessor decides that a DJ is touching the control element with his hands, thus being played immediately and with speed and direction changing in a manner according to the movement of the control element.

* * * * *